United States Patent [19]

Biard

[11] 3,821,775

[45] June 28, 1974

[54] EDGE EMISSION GAAS LIGHT EMITTER STRUCTURE

[75] Inventor: James R. Biard, Richardson, Tex.

[73] Assignee: Spectronics, Incorporated, Richardson, Tex.

[22] Filed: Aug. 13, 1973

[21] Appl. No.: 387,648

Related U.S. Application Data

[63] Continuation of Ser. No. 183,027, Sept. 23, 1971, abandoned.

[52] U.S. Cl. .................................. 357/17, 357/88

[51] Int. Cl. .......................................... H05b 33/00

[58] Field of Search .................. 317/235 N, 235 AJ

[56] References Cited

UNITED STATES PATENTS

| | | | |
|---|---|---|---|
| 3,290,539 | 12/1966 | Lamorte | 313/114 |
| 3,500,135 | 3/1970 | Li | 317/234 |
| 3,512,027 | 5/1970 | Kupoky | 313/108 |
| 3,537,028 | 10/1970 | Pankove | 331/94.5 |

*Primary Examiner*—Martin H. Edlow
*Attorney, Agent, or Firm*—Jack A. Kanz

[57] ABSTRACT

A light emitter structure in which the light output is primarily in the form of edge emission. The structure is a P-side up planar cylindrical unit having a N-type main body into which is diffused a reduced diameter P-type region. A major portion of both the N-type and P-type regions are covered with evaporated and alloyed metal contacts. The device is designed for mounting N-side down with connection to the anode or P-type layer being typically made by gold ball or thermal-compression bond to the alloyed metal ohmic contact on the P-type region. Several embodiments are disclosed. Also disclosed are several mounting techniques.

8 Claims, 8 Drawing Figures

James R. Biard
INVENTOR.

BY Clarence A. O'Brien
and Harvey B. Jacobson
Attorneys

James R. Biard

INVENTOR.

BY Clarence A. O'Brien
and Harvey B. Jacobson
Attorneys

James R. Biard
INVENTOR.

BY Clarence A. O'Brien
and Harvey B. Jacobson
Attorneys

EDGE EMISSION GAAS LIGHT EMITTER STRUCTURE

This is a continuation of application Ser. No. 183,027 entitled EDGE EMISSION GaAs LIGHT EMITTER STRUCTURE filed Sept. 23, 1971, now abandoned.

BACKGROUND OF THE INVENTION

There are many light emitter structures known to the prior art. Each of these known structures, however, has at least one of several common disadvantages. Below, there is a brief description of three known and popular light emitter structures, with a discussion of the disadvantages peculiar to each.

The first type of commonly used light emitter structure is the P-side down flat-type structure. In this type of light emitter structure, a P-type diffused layer covers most of one of the flat faces of the device. The face of the device covered by the P-type material is customarily physically mounted to a header and the light exits from the top of the N-type face. The N-type face is equipped with an ohmic contact, and this ohmic contact is made as small as possible in order to develop the highest possible quantum efficiency; but yet the contact still shadows a portion of the internally generated light, and hence limits the quantum efficiency to some extent.

The P-side down flat-type light emitter is easy to mount, but the necessary small contact area leads to debiasing at high current densities, with such debiasing having two undesirable effects. First, the debiasing leads to changes in radiation pattern and image radiance resulting from changes in current density. And second, at very high current densities, the current crowds to the region under the N-type contact, thereby effectively causing saturation in the light output. In addition to the above, the P-side down flat structure has a low quantum efficiency, due mainly to the occurrence of total internal reflection.

The second type of structure known and commonly used in the prior art is the P-side down dome-type light emitter. Typically, the dome-type light emitter has a diffused P-type region which is smaller in diameter than the hemispherical dome by the ratio of the refractive index of the semiconductor used to the refractive index of air. As a result of this construction, the entire junction lies within a region whereby total internal reflection is eliminated. Hence, the quantum efficiencies of these types of devices are typically ten times higher than the quantum efficiency of the P-side down flat-type light emitters. Since the entire exit surface of the dome-type light emitter structure must be unobstructed for proper operation, these devices typically employ an annular ohmic contact for the N-type region on the flat face of the hemisphere surrounding but not touching the ohmic contact on the P-type region. Again, the ohmic contact on the P-type region entirely covers the junction area, or at least a major portion thereof.

The P-side down dome-type light emitter construction eliminates contact shadowing and saturation due to debiasing at high current densities. However, debiasing still occurs and results in changes in radiation pattern and image radiance at high current densities. And with the two ohmic contacts both on the same surface, the mounting of dome-type light emitter structure requires the use of a sub-mount, a requirement which is costly both in terms of requiring additional precision parts and in terms of greatly adding to the difficulties of assembly.

The third type of known and commonly used light emitter structure is the P-side up flat-type light emitter. The P-side up flat-type structure requires an ohmic contact covering only a minor portion of the P-type region in order to avoid shadowing all of the light output from the device by the contact material. In small size devices, this requirement normally dictates the use of an adherent expanded metal contact system. The use of expanded contacts minimizes obscuration of the junction and allows the electrical bond to be made over oxide in an area removed from the junction.

The P-side up flat-type unit is easy to mount; however, the small area of the ohmic contact on the P-type region leads to serious debiasing at high current densities, with both shadowing and image radiance changes taking place. Because the P-side up flat-type structure is basically a P-type exit surface device, total internal reflection is a serious problem and quantum efficiency is approximately the same as for P-side down flat-type devices. A notable advantage of the P-side up flat-type structure, however, is that it can be scaled to very small junction diameters.

It is toward the elimination of the drawbacks of the prior art devices noted above, that the present invention is directed.

SUMMARY OF THE INVENTION

This invention relates to an improved semiconductor junction device which generated optical radiation in response to an electric current flow across the junction thereof. The theory of operation of the light source is that minority carrier holes and electrons are injected by forward current flow across the junction of the device, while the recombination of the electron-hole pairs produces photons whose energy is near the band-gap of the semiconductor being used, having a narrow band width of maximum intensity, and of about 0.9 micron wave length for galium arsenide. Light sources of this type are substantially more useful in a majority of electronic applications than are conventional light sources for many reasons. As examples, the solid state nature of the device lends itself readily to simplicity, miniaturization and high reliability. Moreover, the light output intensity of such devices can be modulated at very high frequencies by modulating the current flow to the devices.

The present invention relates specifically to an inexpensive compact semiconductor light emitter device with good speed and high quantum efficiency. While many semiconductor materials can be used in the inventive device, the following description is limited to gallium arsenide (GaAs). The inventive light emitter device is a P-side up cylindrical unit in which the light output is primarily in the form of edge emission. The device is of planar construction and comprises, basically, a cylindrical N-type region into the surface of one flat face of which is formed a reduced-diameter P-type region. The reduced diameter P-type region may be formed by any one of several standard techniques, such as diffusion, alloying, solution growth or vapor phase epitaxial deposition. An ohmic contact is provided on the flat face of the N-type region remote from the P-type region; and an insulating film such as $SiO_2$, SiO or $Si_3N_4$ covers a portion of the face of the N-type region into which the P-type region is formed. An ohmic contact is provided on the P-type region and may, if desired, be expanded to cover a portion of the insulating layer over the N-type region.

The device is designed for mounting N-side down with the relatively large area ohmic contact associated with the N-type region, or cathode, physically touching the header or mounting surface, with connection to the ohmic contact associated with the P-type region, or anode, being typically made by gold ball bond techniques.

The advantages of the inventive device over those devices known to the prior art are numerous. For ease of understanding, the paragraphs immediately following will compare the inventive structure with those structures described in the preceding section.

The disadvantages associated with the P-side down flat-type light emitter structure have been noted above. In contrast, the inventive light emitter structure has no debiasing at high current densities, and has a high quantum efficiency. And while total internal reflection is known to significantly degrade the quantum efficiency of the P-side down flat-type light emitter structure, a large part of such degrading total internal reflection is eliminated with the inventive device. In addition to the above, the inventive structure may be mounted with ease comparable to that of the P-side down flat-type light emitter.

The next prior art structure which was discussed above is the P-side down dome-type light emitter. Unlike this prior art structure, which requires a sub-mount, the inventive structure has no annular ohmic contact on the face containing the reduced diameter P-type region, associating with the N-type region. Rather, the inventive device mounts directly to the broad flat ohmic contact covering the entire N-type face of the wafer, hence requiring no sub-mount. As a result of the elimination of the sub-mount, the inventive light emitter structure is significantly reduced in cost and is capable of being scaled down to an overall diameter on the order of 9 mils with a junction diameter on the order of 2.5 mils. For the dome-type structure with sub-mount, such a size reduction is impractical at best. As an added advantage of the inventive structure, the junction diameter is made equal to or less than 1/3.6 of the index of refraction ratio times the wafer diameter, such dimension minimizing total internal reflection for the edge emission, and thereby increasing the quantum efficiency of the device. (While the quantum efficiency of the inventive device is on the order of 25 percent that of the dome-type structure, it is approximately 2.5 times that of the known flat-type devices.) Because the ohmic contacts cover a major portion of the opposing N- and P-type faces of the inventive device, there is essentially no debiasing at high current densities, and the radiation pattern remains unchanged at such high current densities.

The last prior art structure discussed in the preceding section is the P-side up flat-type light emitter. Again, the inventive structure offers advantages not found in such a prior art structure. As noted previously, the quantum efficiency of the inventive structure is on the order of 2.5 times higher than that of the flat-type light emitter. And unlike the P-side up flat-type light emitter, there is no debiasing at high current densities with the inventive structure.

The inventive light emitter device may be embodied in a number of alternate configurations. These configurations are each illustrated and described in detail in the following pages, but are briefly described immediately below. In the first embodiment of the inventive device, the structure takes the form of a right cylindrical unit. In the second embodiment, the curved walls of the device are tapered into the form of a segment of a cone, in this manner increasing the light output by diminishing the effects of P-layer absorption. In a third embodiment, the N-type flat face is roughened before the associated ohmic contact is applied, thereby increasing the emission from the top surface of the device by light reflection from the roughened bottom surface.

In addition to the embodiments of the light emitter structure described in the preceding paragraph, the present invention relates to several structures for mounting the inventive device. In one embodiment, the light emitter is mounted in the center of a reflector with the ohmic contact to the N-type region being formed by the reflector itself. In this manner, most of the light which exits the device surface is coupled out of the top of the system. The optical beam pattern of the emitted light may conveniently be controlled by shaping the reflector. One special type of reflector has the inventive wafer mounted on a flat reflecting plane near the focus of the reflector. In this manner, the downwardly directed rays are reflected by the planar surface into the shaped reflector such that these rays appear to come from the mirror image of the wafer. Hence, the effective size of the optical source is the wafer plus its reflection in the planar mirror.

In still a further embodiment, the shape of the reflector is such that the bottom lip of the reflector is moved slightly downward with respect to the planar reflecting surface. In this manner, the rays which were once lost in the insulation between the planar mirror and the curved reflectors are reflected out of the top of the system.

In yet another embodiment of the invention the light emitting wafer is mounted in a high index of refraction transparent material, such as epoxy, with or without a reflector. Such mounting increases the critical angle of the unit (to be explained below) from approximately 16.2° for a GaAs-air interface to approximately 26.4° for a GaAs-epoxy interface, with the epoxy having an index of refraction of 1.6. This increase in critical angle makes it possible to reduce the amount of GaAs in the wafer, thereby reducing the cost of the unit and the absorption due to a decreased path length in the GaAs. Further, the increased critical angle of the unit significantly increases the light output by reducing total internal reflection.

It should be appreciated that the inventive device is extremely versatile. For each of the embodiments described, the junction radius, wafer radius, cone angle, reflector shape, indexes of refractions, and shape and location of reflector focuses with respect to the light emitting devices, are flexible design variables which may be changed to optimize the cost and performance of the light emitter structure, or make the structure particularly suitable for a specific application.

Accordingly, it is an object of the present invention to provide a versatile, inexpensive and compact light emitter structure having excellent speed characteristics and a high quantum efficiency.

A further object of the present invention is to provide a compact light emitter structure which is relatively easy to mount.

It is another object of the present invention to provide a novel light emitter structure having little or no debiasing at high current densities.

Yet another object of the present invention is to provide a novel light emitter structure having a very low level of total internal reflection and thereby having a high quantum efficiency.

Yet a further object of the present invention is to provide a novel light emitter structure in which the light output is primarily in the form of edge emission.

Another object of the present invention is to provide a novel edge emission light emitter structure in combination with a reflector system for collecting and directing the light output from the novel structure.

A further object of the present invention is to provide a novel combination of a light emitter structure and a reflector mount whereby substantially all the light emergent from the emitter structure strikes the reflector surface and exits the combination structure in a controlled manner.

Still another object of the present invention is to provide a light emitter structure encapsulated in such a manner that the total light output is increased without a corresponding increase in the amount of semiconductor materials used.

These and other objects of the present invention, as well as many of the attendant advantages thereof, will become more readily apparent when reference is made to the following description taken in conjunction with the accompanying drawings.

BRIEF DESCRIPTION OF THE DRAWINGS

FIG. 1(*b*) is a side view of the structure illustrated in FIG. 1(a);

DETAILED DESCRIPTION OF THE DRAWINGS

Figure 1A:
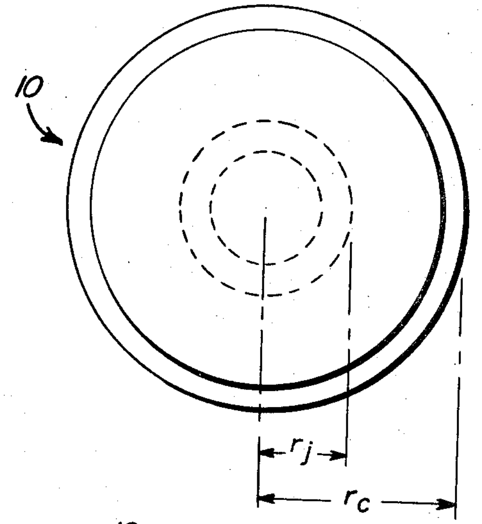
FIG. 1(*a*) is a top view of a light emitter structure constructed in accordance with the teachings of the present invention.
Figure 1B:
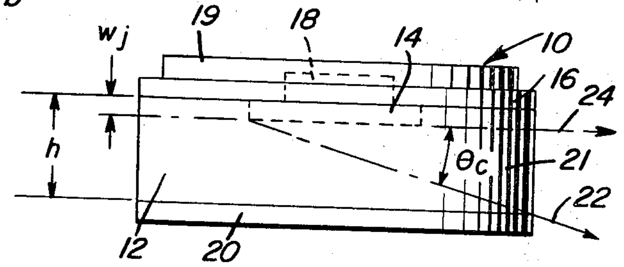

With reference to FIGS. 1(*a*) and 1(*b*), the characteristics of the first embodiment of the inventive edge emission light emitter structure will be described. The inventive device is a gallium-arsenide (GaAs) structure and is shown generally at 10. The device 10 is developed from a main cylindrical body portion 12 of N-type material into the center of one face of which is formed, for example, by diffusion, a thin P-type layer 14. As seen in FIG. 1(*b*), the layer 14 penetrates only a small depth into the body 12. Covering a portion of the face of the N-type body 12 is an insulating film 16. An ohmic contact 18 of a diameter slightly less than that of the P-type region 14, is attached to the region 14. An adherent expanded metal layer 19 may be applied over the ohmic contact 18 and the insulating layer 16, preferably having a diameter only slightly smaller than the main body 12. It should be appreciated, however, that the layer 19 illustrated in FIG. 1 is optional. An ohmic contact 20 covers substantially the entire face of the N-type main body 12 remote from the ohmic contact 18 associating with the P-type region 14. The exit surface is represented by the number 21.

As noted previously, the inventive structure is, for example, of the GaAs type. The index of refraction of GaAs at the emission wave lengths involved, is about 3.6. The inventive wafer is dimensioned, based upon this index of refraction, so that total internal reflection in the wafer is substantially reduced. This is accomplished by properly dimensioning the junction radius ($r_j$), the radius of the wafer ($r_c$), the height of the wafer ($h$), and the depth of the junction ($w_j$). With the index of refraction of GaAs being 3.6, total internal reflection can be substantially eliminated by making $r_j \leqq 1/3.6 \times r_c$. Of course, the wafer height should be made large enough so that no critical ray (a ray travelling at the critical angle; $\theta_c = \sin^{-1} N_1/N_2$, where $N_1$ and $N_2$ are indexes of refraction and where $N_2 > N_1$) from any part of the junction strikes the ohmic contact on the N-type region before striking the exit surface. A typical limiting ray is indicated at 22 in FIG. 1(*b*). With the critical angle for a GaAs-air interface being on the order of 16.2°, and choosing values of $r_c$ and $w_j$ of 9.0 mils and 0.4 mils, respectively, geometric considerations dictate that $r_j$ be $\leqq$ 2.5 mils and that $h$ be $\geqq$ 3.1 mils.

As noted in the preceding paragraph, the inventive wafer should be dimensioned so that the limiting ray 22 exits the structure 10 without being reflected from the ohmic contact 20 on the N-type region. This maximizes the light output of the device from rays directed downwardly between the limiting ray 22 and the ray 24 parallel to the junction between the regions 12 and 14. Such downwardly directed rays, however, make up only one-half of the light rays generated by the inventive device. There is another set of rays of equal number generated by the inventive device and directed upwardly with respect to ray 24. While substantially all the light energy from the downwardly directed rays is useful, such is not the case with upwardly directed rays. Some of the rays generated in the upwardly directed set are substantially absorbed in the more heavily absorbing P-type material 14 before exiting the structure 10. A small number of rays with slightly rising trajectories directly strike the exit surface 21. And some of the rays with rising trajectories are totally internally reflected from the top face of the wafer. The light energy attributable to the upwardly directed rays which is not totally absorbed or totally internally reflected adds to the energy attributable to the downwardly directed rays and hence adds to the output of the inventive device.

Because of the high absorption in the P-type layer 14, the rays with rising trajectories contribute to the total light output only about one-third of their possible output without absorption. In any event, these rays do add to the total output of the inventive device, hence significantly increasing the quantum efficiency thereof. As mentioned previously, while the quantum efficiency of such a device is only approximately 25 percent that of the dome-type light emitter structure, it is still significantly higher than the quantum efficiency of both the P-side down and the P-side up flat-type light emitters. And, the inventive structure also eliminates the drawbacks of the dome-type structure.

Figure 2:
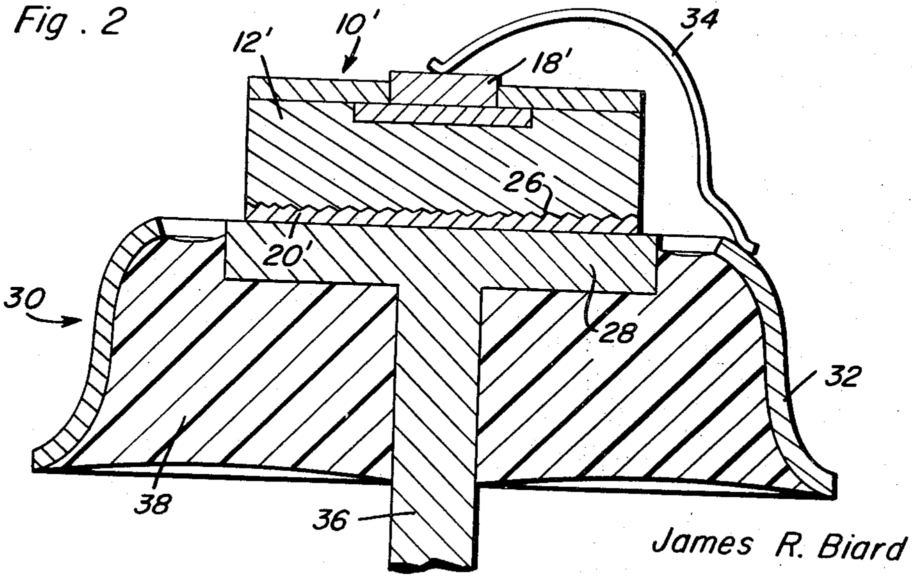
FIG. 2 is a cross-section illustrating a second embodiment of the inventive light emitter structure showing one manner of mounting the inventive device.

With reference now to FIG. 2, there will be described a second embodiment of the inventive light emitter structure, showing a typical mounting arrangement. The light emitter structure illustrated in FIG. 2 is identical to that structure illustrated in FIGS. 1($a$) and 1($b$) in all respects but for the configuration on the surface of the N-type material 12 abutting the ohmic contact 20 and the absence of the adherent expanded metal layer 19. In FIG. 2, before the ohmic contact 20' is applied to the N-type main body 12', the lower face of the body 12' is roughened as indicated at 26. Since none of the edge emission light strikes the ohmic contact 20', the edge emission of the device illustrated in FIG. 2 is identical with that illustrated in FIGS. 1($a$) and 1($b$). However, the emission through the top surface is enhanced due to light being reflected from the roughened N-type surface 26 such that the light strikes the top exit surface at an angle less than $\theta_c$ to the normal.

The mounting and biasing of the inventive light emitter structure are accomplished as follows. As noted previously, the inventive device is adapted for mounting with the large area ohmic contact adjacent the N-type main body 12 physically touching one electrode of the mount. As seen clearly in FIG. 2, the ohmic contact 20' is in physical contact with header 28 forming one electrode on the mount which is shown generally at 30. The header is integral with a post 36 forming an external connection member. The second electrode of the mount takes the form of a substantially cylindrical open ended cup 32. The cup 32 is connected, by means of a lead wire 34, to the other ohmic contact 18' of the structure 10'. To ensure the integrity of the mount, and to facilitate the connection of the device into the appropriate circuitry, post 36 integral with header 28 is maintained in a spaced relationship with the cup 32 by means of an insulating material fill 38 such as of glass or epoxy.

Figure 3:
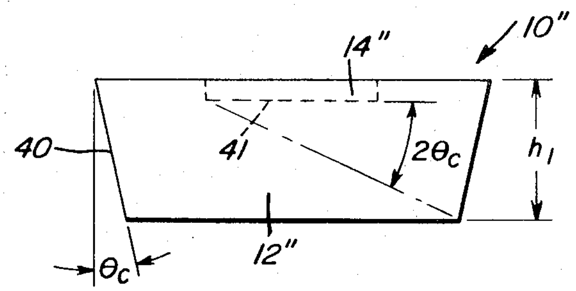
FIG. 3 is a side view of a third embodiment of the inventive light emitter structure.

With reference now to FIG. 3, a third embodiment of the inventive structure will be described. For ease of description, however, the device illustrated in FIG. 3 has been reduced to only two of its elements; but it should be understood that the FIG. 3 device has the external contacts and associated elements described above and illustrated in FIGS. 1 and 2. In FIG. 3, the inventive wafer is shown generally at 10'' and includes an N-type main body region 12'' and a P-type region 14'' diffused into the region 12''. The device illustrated in FIG. 3 differs from that of FIG. 1 in the following respects. The exit surface of the FIG. 3 device is shown at 40 and slopes so as to define, with the top and bottom surfaces of the device, a segment of a cone, the exit surface sloping downwardly and inwardly, defining an angle equal to or less than the critical angle $\theta_c$ with the normal. The height $h_1$ of the FIG. 3 device is greater than the height $h$ of the FIG. 1 device by an amount sufficient to ensure that no light rays encounter the ohmic contact on the N-type main body (not shown) before exiting the surface 40. For the limiting case, in which the exit surface slopes at $\theta_c$, the height $h_1$ is determined so that an angle of twice $\theta_c$ is defined between the plane of the junction 41 and the line extending from one extremity of the junction 41 to the opposite lower edge of the exit surface 40. With the device as shown in FIG. 3, the light output is increased by eliminating the effects of P-layer absorption. The quantum efficiency of such a device is increased to approximately three-eighths that of the dome-type light emitter structure, and therefore is significantly higher than other known flat-type light emitters.

Figure 4:
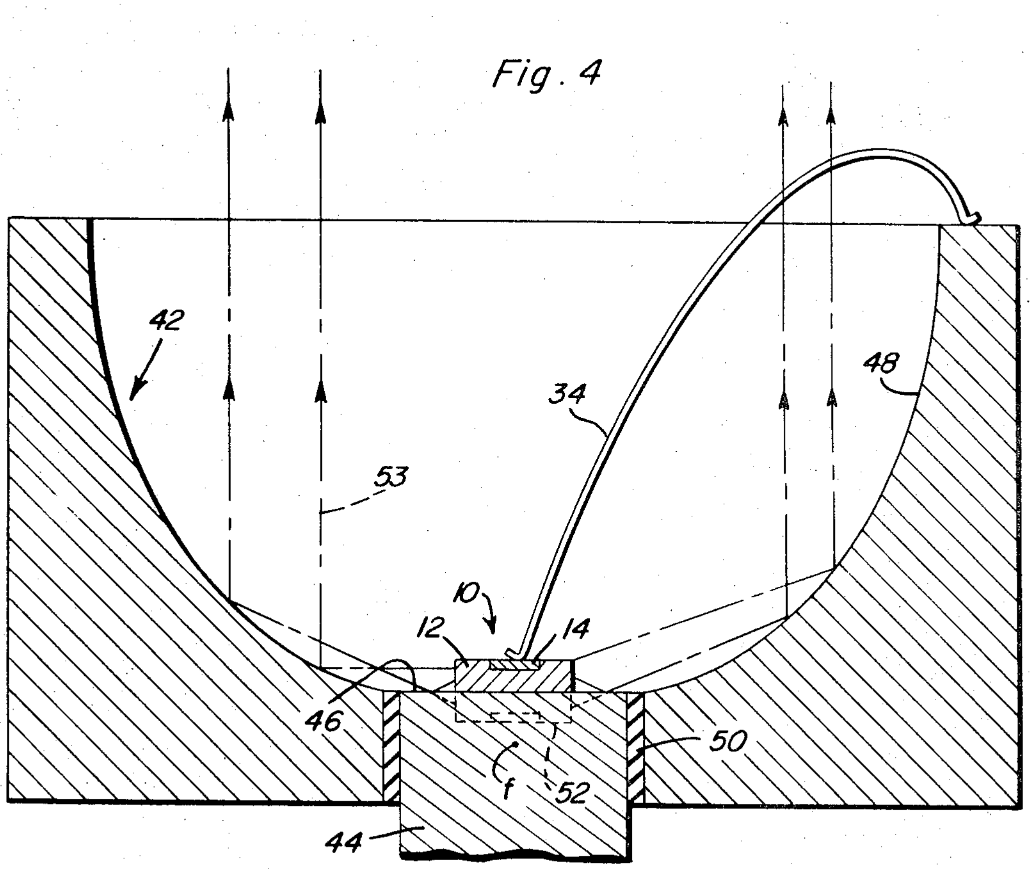
FIG. 4 is a cross-section illustrating an inventive light emitter structure showing a second manner of mounting same.

In FIG. 4, the inventive light emitter structure 10 is illustrated as mounted in a reflector shown generally at 42. The inventive device 10 is mounted by means of its ohmic contact on the N-type main body, to a conductive column 44, the upper surface 46 of which is planar and reflective. Associating with and forming an extension of the planar reflective surface 46 is the surface 48 of the reflector 42. Insulation 50 separates the column 44 from the reflector 42 and maintains these elements fixed one with respect to the other. A lead wire 34 conductively joins the P-type region 14 to the reflector 42 making the reflector itself one terminal of the inventive device.

The configuration illustrated in FIG. 4 ensures that most of the light which exits the wafer is coupled out of the reflector aperture. Unlike the dome-type light emitter, the light output from the inventive light emitter structure is largely directed downwardly. By mounting the wafer 10 as illustrated in FIG. 4, the planar surface 46 has the effect of reflecting the downwardly directed rays into the shaped reflector. Hence, these rays appear to come from the mirror image of the wafer as seen in the reflector (shown at 52). The result of such an arrangement is that the effective size of the optical source is the wafer plus its reflection in the planar mirror. In this configuration, the focus of the reflector 42 should lie on the axis of the reflector somewhere below the P-type region 14. While the best location of the focus depends upon the particular application for the device, one of the preferred locations of the reflector focus is shown in FIG. 4 at $f$.

As seen in FIG. 4, some of the rays, such as ray 53, strike the surface 48 of the shaped reflector 42 without being reflected from the planar surface 46. Because of the shape of the reflector, all rays reflected therefrom are added to the total light output of the system. In addition, all rays emitted through the upper surface of the device, resulting from out diffusion of the P-type layer 12 or the roughened ohmic contact (if provided), add to the external emission thereby even further increasing the total quantum efficiency of the combined wafer-reflector structure.

Figure 5:
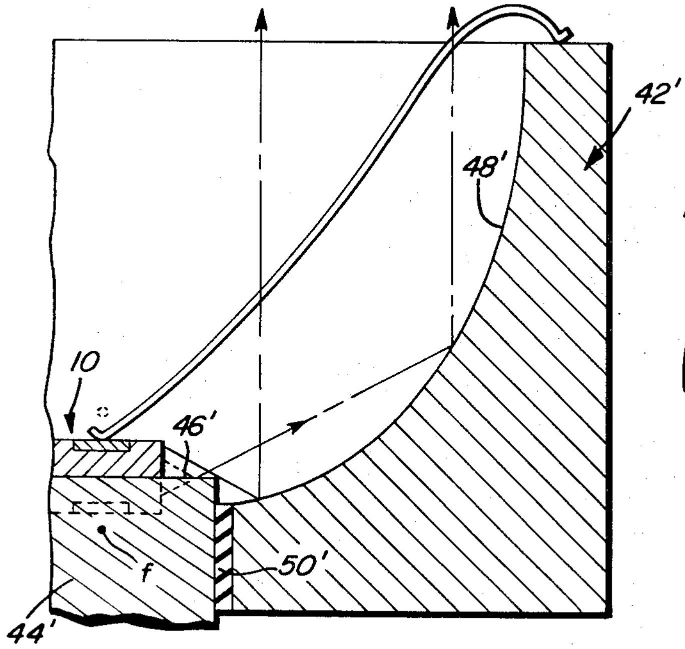
FIG. 5 is a view similar to FIG. 4, but showing a third mounting arrangement.

FIG. 5 illustrates a combined light emitter structure and mount having a quantum efficiency even higher than that combination illustrated in FIG. 4. It can be seen that the structure of FIG. 5 differs from that shown in FIG. 4 in that the column 44' is raised so that the planar surface 46' thereof lies above the bottom lip of the reflector 42'. In all other respects, the arrangement illustrated in FIG. 5 is identical with that shown in FIG. 4.

The increased efficiency of the combination illustrated in FIG. 5 over that illustrated in FIG. 4 results from the fact that in FIG. 4, there are some rays emergent from the light emitter structure 10 which penetrate into the insulation 50 between the column 44 and the reflector 42. These rays are lost. In FIG. 5, on the other hand, resulting directly from the planar reflecting surface 46' lying above the bottom lip of the reflector 42', no ray is allowed to emerge from the light emitter structure 10 and enter the insulation layer 50'. Rather, those rays which, in FIG. 4, would have entered the insulation layer 50, are carried past the FIG. 5 insulation 50' and reflect from the surface 48' of the reflector 42', thus even further adding to the output of the device.

Before describing the fourth embodiment of the inventive light emitter structure, it is thought appropriate to give a brief discussion of the technology involved. The critical angle associated with the cylindrical light emitter structure illustrated in FIGS. 1(*a*) and 1(*b*), as it relates to the index of refraction of the material of the structure, has been mentioned above. With such light emitter structure surrounded by a transparent insulating material such as epoxy, however, the critical angle between the GaAs wafer and the epoxy increases, this increase being due to the index of refraction of the epoxy. For example, with an epoxy having an index of refraction equal to 1.6, the critical angle of the epoxy-covered wafer increases to 26.4°. As a result of this increase in the critical angle, the wafer diameter can be decreased for a given junction diameter or, alternatively, the junction and wafer diameters can be maintained unchanged and the small radial refraction angles used to improve the beam pattern. In either case, the quantum efficiency of the unitary structure increases.

Figure 6:
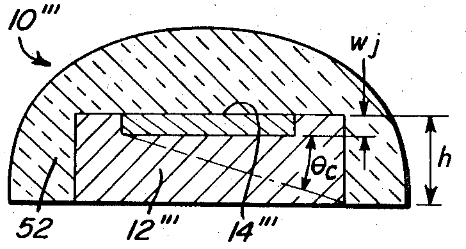
FIG. 6 is a cross-section illustrating a fourth embodiment of the present invention.

With reference now to FIG. 6, an epoxy clad GaAs light emitter structure constructed in accordance with the teachings of the present invention will be described. In FIG. 6, the novel light emitter structure is shown generally at 10'''. The structure comprises, basically, an N-type main body region 12''' into the center of which is diffused a P-type region 14'''. Covering both the N-type and P-type regions is a body of insulating materials 52 such as epoxy. Of course, biasing contacts are necessary for an operative device, but these are now shown. As mentioned previously, by covering the edge emission structure with epoxy, the dimensions of the N-type region 12''' may be reduced or, alternatively, the dimensions of the wafer may be unchanged and the radial refraction angles may be reduced. In the structure of FIG. 6, compared with that of FIG. 1, the diameter of the region 14''' is held constant. With the diameter of region 14''' equal to that of FIG. 1, the diameter of the main body region 12''' is significantly decreased. In fact, even with the epoxy adding to the overall diameter of the structure, such overall diameter remains substantially equal to that of the FIG. 1 structure. To balance the decreased diameter of the region 12''' and the increased critical angle for avoiding total internal reflection for the edge emission, the height of the region 12''' must be somewhat increased. However, the decreased diameter more than counteracts the increased height from a materials standpoint.

There are two principle advantages resulting from the configuration illustrated in FIG. 6. First, the presence of epoxy and the resultant increased critical angle permit a reduction of the amount of GaAs in the wafer. This reduces the cost and also reduces the absorption due to the decreased path in the GaAs through which the rays of light must travel before exiting. The epoxy is transparent. Second, by increasing the critical angle from 16.2° (FIG. 1) to 26.4° (FIG. 6), there results a significant increase in light output even if the wafer dimensions are not changed. As noted previously, the quantum efficiency of the novel light emitter structure illustrated in FIG. 3 is only on the order of three-eighths that of the dome-type light emitter structure. However, the efficiency of the epoxy clad wafer is significantly higher; the efficiency of an epoxy-coated cylindrical device increases to 44 percent that of a dome-type structure, and the efficiency of an epoxy-coated tapered device increases to 66 percent that of the dome-type light emitter structure, the epoxy index of refraction being 1.6 and the taper angle being 26.4°. Taper angles between 0 and $\theta_c$ and epoxys with indexes of refraction less than 1.6 are also beneficial, but these give less improvement than those stated above. Likewise, other transparent dielectrics such as glasses with indexes of refraction higher than 1.6 will give even more improvement than those stated above.

Figure 7:
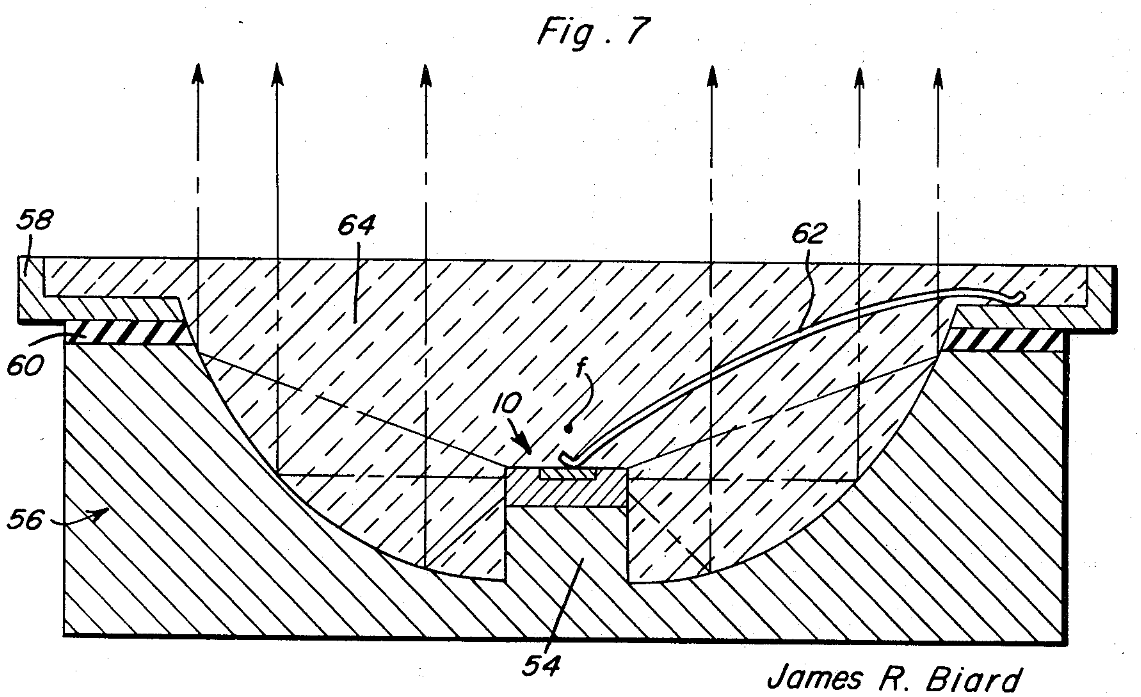
FIG. 7 is a cross-section illustrating the inventive light emitter structure associated with a fourth type of mount.

With reference now to FIG. 7, still another type of mounting arrangement for the inventive light emitter structure will be described. In FIG. 7, the light emitter structure 10 is mounted on a conductive post 54 having substantially the same diameter as that of the structure itself. The post 54 rises above the base of a shaped reflector 56 and is of such a height that when the wafer 10 is mounted on the post, the focal point *f* of the reflector 56 typically lies slightly above the surface of the wafer. The post 54 and its integral reflector 56 define one external terminal for the light emitter structure 10. The second terminal is defined by a conductive ring 58 insulated from the body of the reflector 56 by means of an interposed layer of insulation 60. A lead wire electrically connects the ring to the P-type region of the structure 10. The dish of the reflector is filled with a transparent insulator 64, such as epoxy, to maximize the light emitted from the wafer as was described with reference to FIG. 6. The epoxy-filled reflector of FIG. 7, however, has a significant advantage over the structure shown in FIG. 6 in terms of the control of the beam angle emitted from the structure. While the total light emitted is the same for the FIG. 6 and FIG. 7 devices, the light emitted from the FIG. 6 device is almost all downwardly directed with respect to the plane of the base of the device and is significantly refracted at the air-epoxy interface. In the epoxy-filled reflector, the light exits the device into the epoxy and is redirected by a reflector before passing through the epoxy-air interface. While the light is also here refracted at the epoxy-air interface, the effect of this refraction is minimized because the redirected light strikes the epoxy-air interface close to the normal.

In FIG. 7, the epoxy surface is shown to be flat at the epoxy-air interface. However, some curvature may be defined in the epoxy so as to interact with the shaped reflector. Such a combined effect ensures a greater degree of control over the optical beam angle of the structure than can be obtained with the reflector alone or with the device of FIG. 6 used with the reflector shown in either FIG. 4 or FIG. 5.

With the mounting embodiment illustrated in FIG. 7, having no planar mirror, the height of the optical source is essentially reduced by a factor of two from those sources shown in FIGS. 4 and 5. The reflector dish is also reduced in height. In addition to the above, with such an arrangement, the centering of the wafer in the reflector is significantly simplified in view of the fact that the post 54 is of a diameter equal to that of the wafer 10. Because most of the rays emergent from the inventive light emitter structure 10 are directed downwardly, and because the small number of rays which are directed upwardly have only very shallow angles, it is possible to use the reduced depth reflector and have all the light which leaves the wafer strike the reflector surface. Further, such an arrangement offers the advantage that since the portion of the reflector near the plane of the focus is used, rather than the portion near the base thereof, the beam angle may be better controlled. As noted previously, the focus of the shaped reflector is shown to be somewhat above the upper surface of the wafer 10. This is done so that rays exiting the edge of the wafer project back through the focal point, thereby preventing the emission of a hollow beam in the far field beam pattern.

While several embodiments of the present invention have been described, it should be understood that these embodiments are set forth for purposes of illustration only and that many alterations and modifications may be practiced by those skilled in the art without departing from the spirit and scope of the invention. For example, while the invention has been described with reference to a planar diffused GaAs light emitter, necessitated by high speed considerations, the present invention also is applicable to mesa type solution grown units. Further, the inventive light emitter structure also has excellent performance characteristics when used with InGaAs, GaAsP, GaP, GaAlAs, and InGaP light emitters, particularly those which are constructed on wider band gap substrates to minimize absorption. Further, the teachings of the present invention are applicable also to InSb, InSbAs, InAs, PbTe, PbSnTe and HgCdTe light emitters. It should be appreciated that the several concepts described above may be combined one with another. For example, the epoxy filled reflector of FIG. 7 may be combined with the conical wafer as taught in FIG. 3, or the post in FIG. 7 may be insulated from the reflector as shown in FIGS. 4 and 5. It is the intent, therefore, that the invention not be limited by the above but be limited only as defined in the appended claims.

What is claimed:

1. A semiconductor device comprising:

a. a unitary concave reflector having a flat circular mounting surface formed in the base thereof, b. a wafer of semiconductor material of a first conductivity type mounted on said mounting surface and in ohmic contact therewith, said wafer of semiconductor material comprising a body having substantially parallel top and bottom surfaces which are circular in plan view, the peripheral side surface interconnecting the top and bottom surfaces being straight in vertical cross section with the side surface intercepting the plane of said top surface at an angle of from 0° to $\sin-^{-1}N_1/N_2$ from a plane perpendicular to said top surface, where $n_2$ is the index of refraction of said semiconductor material and $N_1$ is the index of refraction of the surrounding medium, the height of said body being not less than the sum of i. the vertical distance between the horizontal plane of a P-N junction formed in said body and the horizontal plane at which a ray from one extreme edge of said junction may strike a side surface on the opposite side of said body at the critical angle, and ii. the depth of the junction;

c. a planar region of a second conductivity type substantially centered in the top surface of said wafer, the radius of said planar region being no greater than the product of i. the radius of the top surface of said body, and ii. the ratio $N_1/N_2$; and d. second electrical contact means in ohmic contact with said region.

2. The semiconductor device defined in claim 1 wherein said second electrical contact means substantially covers said planar region.

3. The semiconductor device defined in claim 1 further including an insulating layer covering the top surface of said body including the surface of said region not covered by said second electrical contact means.

4. The semiconductor device defined in claim 3 wherein the area of said second electrical contact means is substantially larger than the area of said region and the portion thereof overlying said insulating layer is adherent to said insulating layer.

5. The semiconductor device defined in claim 1 including a transparent medium surrounding said body, said medium having an index of refraction higher than air.

6. The semiconductor device defined in claim 1 wherein the bottom surface of said wafer of semiconductor material is roughened before said wafer is mounted on said mounting surface.

7. The semiconductor device defined in claim 1 wherein the focal point of said unitary concave reflector lies above the top surface of said wafer.

8. The semiconductor device defined in claim 1 wherein said wafer of semiconductor material is gallium arsenide, said first conductivity type is N-type, and said second conductivity type is P-type.

* * * * *

UNITED STATES PATENT OFFICE
CERTIFICATE OF CORRECTION

Patent No. 3,821,775 Dated June 28, 1974

Inventor(s) James R. Biard

It is certified that error appears in the above-identified patent and that said Letters Patent are hereby corrected as shown below:

$$\sin\text{—}\ \frac{{}^{-1}\ N_1}{N_2} \quad \text{should read} \quad \sin^{-1} \frac{N_1}{N_2}$$

Signed and sealed this 15th day of October 1974.

(SEAL)
Attest:

McCOY M. GIBSON J.
Attesting Officer

C. MARSHALL DANN
Commissioner of Patents